United States Patent [19]

Gabor

[11] 4,394,720
[45] Jul. 19, 1983

[54] AUTO-STABILIZED HIGH POWER ELECTRIC GENERATOR ESPECIALLY ADAPTED FOR POWERING PROCESSES INVOLVING DISCHARGE IN A RAREFIED GASEOUS ATMOSPHERE

[75] Inventor: Gabriel Gabor, Petit-Beauregard, France

[73] Assignee: Jean Frager, Paris, France

[21] Appl. No.: 215,144

[22] Filed: Dec. 10, 1980

[51] Int. Cl.³ .......................................... H02M 5/438
[52] U.S. Cl. ........................................ 363/37; 363/96
[58] Field of Search ....................... 363/23, 25, 27, 28, 363/37, 86, 96

[56] References Cited

U.S. PATENT DOCUMENTS

| 3,341,737 | 9/1967 | Rosa | 363/37 X |
| 4,086,622 | 4/1978 | Vukasovic | 363/37 |
| 4,200,830 | 4/1980 | Oughton et al. | 363/28 X |
| 4,301,498 | 11/1981 | Farrer | 363/25 |
| 4,336,584 | 6/1982 | Careglio | 363/96 X |

Primary Examiner—William M. Shoop
Attorney, Agent, or Firm—Scully, Scott, Murphy & Presser

[57] ABSTRACT

An auto-stabilized high power current generator which comprises a controllable frequency oscillator connected to a rectifier by means of a circuit including, in series, an induction coil, a measuring circuit developing a signal representing the current flowing between the oscillator and the rectifier, and a comparator for comparing the measuring circuit signal with a reference signal, and which controls the frequency of the oscillator to cause an increase therein when the measuring circuit signal exceeds the reference signal. The frequency of the oscillator is regulated by a switching circuit controlled, in the event the detected signal is less than the reference signal, by a timing device, and in the event the detected signal is higher than the reference signal, by the pulses delivered by the comparator. The invention is particularly applicable for supplying power to a process involving a discharge in a rarified gaseous atmosphere.

7 Claims, 2 Drawing Figures

AUTO-STABILIZED HIGH POWER ELECTRIC GENERATOR ESPECIALLY ADAPTED FOR POWERING PROCESSES INVOLVING DISCHARGE IN A RAREFIED GASEOUS ATMOSPHERE

BACKGROUND OF THE INVENTION

1. Field of the Invention

The present invention relates to an auto-stabilized high power electric power supply generator, especially but not exclusively for powering of processes involving a discharge into a rarefied gaseous atmosphere. The invention is advantageously applied to a furnace for the thermal or thermochemical treatment of metals by ionic bombardment.

2. Description of the Prior Art

It is known that furnaces of the aforesaid kind comprise an anode and a cathode serving as a support for pieces to be treated, connected to a power circuit with a high voltage electric current.

Therefore, according to a first embodiment there is applied between the cathode and anode a potential difference such that, following a transitional period, the process is maintained in the irregular discharge zone of the voltage intensity curve, incident to an electrical discharge in the gas contained in the furnace.

This embodiment makes it possible to obtain a significant dissipation of energy at the cathode and, consequently, cause rapid heating of the piece.

However, its principal drawback resides in the fact that being near the arcing region, there is frequently produced the beginnings of arcing which pose the risk of deteriorating the pieces notwithstanding the use of systems for arc rupture.

A second embodiment uses, instead of a continuous current, high voltage current pulses, the total energy of which has a predetermined value calculated in such a way that there cannot be produced any arc formation, even if the arc formation zone is attained on the voltage/intensity discharge curve.

Therefore, ions are essentially obtained with a high kinetic energy and in a very limited quantity, which makes it possible to increase the quality of the treatment and its homogeneity without involving an excessive temperature level.

However, a drawback of this process resides in that the treatment temperature is obtained only after a rather long period of time and, in addition, is unsuitable for high levels of power.

SUMMARY OF THE INVENTION

The invention has, therefore, for its goal to eliminate all of these drawbacks. To achieve this object, a power supply generator is provided which delivers an auto-stabilized, high power, rectified current in which a drastic reduction of the resistance of the circuit employed is compensated:

on the one hand, by a corresponding increase in the internal impedance of the generator so as to limit the current flowing in the circuit, and optionally, on the other hand, by a corresponding reduction in the available power of the generator.

To obtain the increase of internal impedance of the generator, the invention uses the well known properties of induction coils and, in particular, the fact that the impedance Z of an induction coil varies as a function of the frequency of the current supplied to it according to the relation $Z = LW$ in which $L$ is the inductance and $W$ is the frequency of the signal.

To achieve this, the generator according to the present invention comprises at least one variable frequency oscillator connected to a rectifier circuit by means of a connecton comprising, in series, an induction coil, a measuring device furnishing a signal representative of the current flowing between the oscillator and the rectifier, and a comparator comparing the signal with a reference signal, and which effects the control of the frequency of the oscillator so as to produce an increase in this frequency when the detected signal becomes greater than the reference signal. In the latter case, the frequency increase of the oscillator involves a corresponding increase in the impedance of the induction coil, and consequently, a reduction of the magnitude of the current flowing between the oscillator and the rectifier. The power supplied in the circuit will therefore be reduced. Thus, in the case where the circuit is used with a treatment furnace by ionic bombardment, the operating level of the furnace is stabilized in an area very near the arc formation area without any arc being produced therein.

More specifically, the oscillator is regulated by means of a controlled switching device, and in the event the detected signal is less than the reference signal, by a timing device, and in the event the detected signal is greater than the reference signal, by the pulses generated by said comparator oscillator.

According to another embodiment of the invention, the signals generated by said oscillator are also controllable in amplitude. In this case, the regulation of the oscillator can be effected by a constant frequency pulse generator, the amplitude of which varies as a function of the deviation signal furnished by said comparator.

In the previously described embodiments, the oscillator is powered by a source of continuous current. This source of continuous current can be the alternating current of a local power supply, for example, a single-phase or three-phase current.

In the latter case, according to another embodiment of the invention, a controllable power supply is employed which is regulated as a function of the difference between the detected signal and the reference signal and/or as a function of the difference between a signal representing the intensity of the current flowing from said source and said reference signal.

BRIEF DESCRIPTION OF THE DRAWINGS

One embodiment of the invention will be described hereafter, as a nonlimiting example, with reference to the attached drawings in which.

DESCRIPTION OF THE PREFERRED EMBODIMENTS

Figure 1:
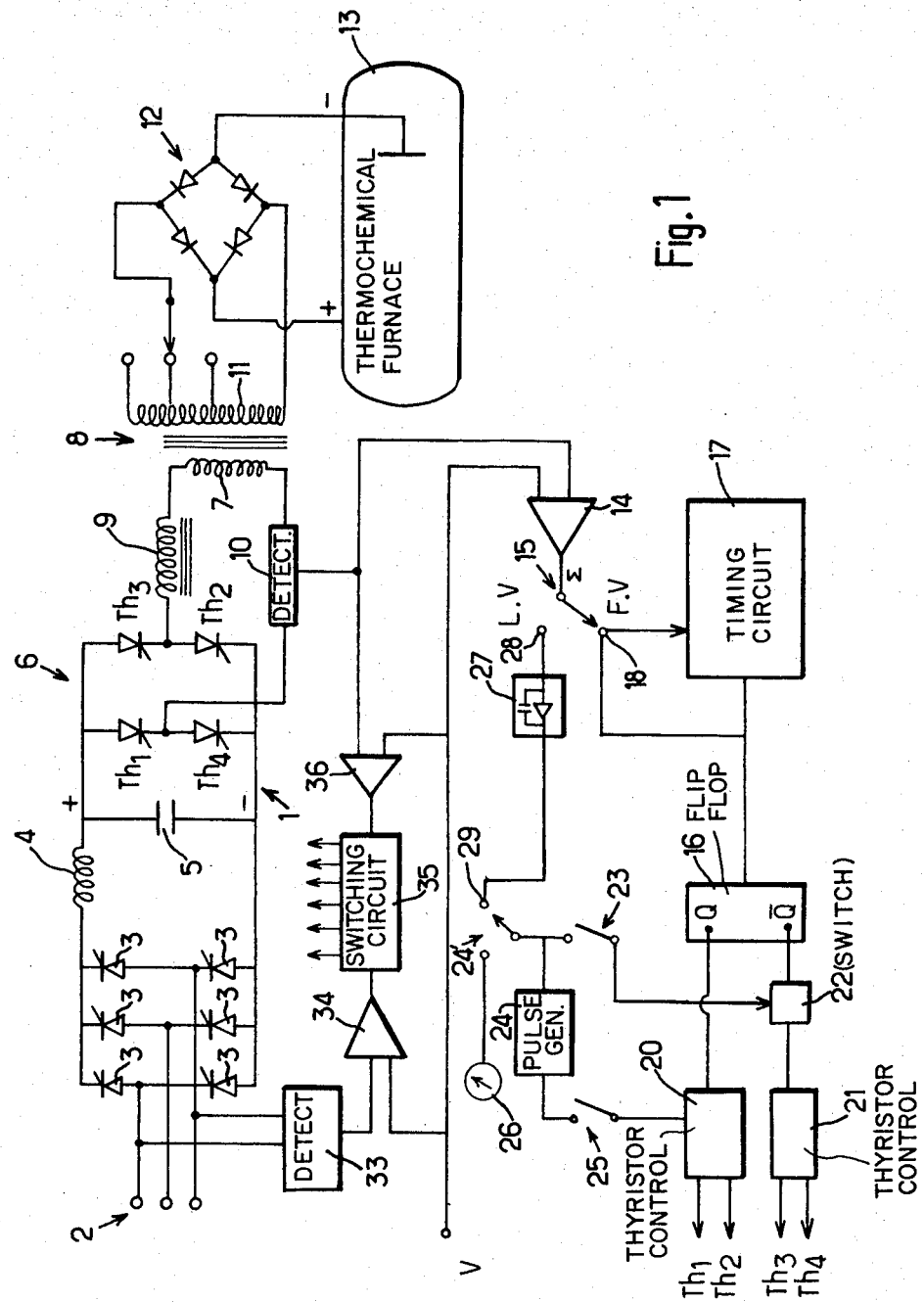
FIG. 1 is a diagram of a high voltage current generator useful for powering of a treatment furnace by ionic bombardment.

With reference to FIG. 1, the generator comprises, a controllable power supply of continuous current 1 operating from a three-phase network 3, mounted in a bridge, followed by an LC filter formed by inductor 4 and capacitor 5. The variation of power in such a generator is obtained by varying the conduction or phase angles of thyristors 3.

The continuous voltage furnished by generator 1 is transmitted to a bridge oscillator 6 formed by an assembly of four thyristors $Th_1$, $Th_2$, $Th_3$, $Th_4$, arranged in a bridge and regulated by a switching system which is described hereafter.

The output of oscillator 6 is connected to the primary circuit 7 of a transformer 8 by means of a circuit comprising, in series, induction coil 9 and detector 10 to measure the voltage across the circuit.

The output of the secondary circuit 11 of transformer 8 is connected through several relay switches to a full wave bridge 12 formed by rectifiers which feed a rectified current to an ionic bombardment thermochemical treatment furnace 13.

The signal furnished by detector 10 is in the form of a voltage, and is transmitted to comparator 14 which receives at its other input a reference voltage $V_{ref}$. This comparator 14 is particularly designed to generate a difference or deviation signal between the magnitudes of the reference signal $V_{ref}$ and the detected signal when the latter becomes greater than the reference signal.

The output of comparator 14 is connected to switch 15 to switch deviation signal $\epsilon$ to one or the other of two control circuits in oscillator 6, namely:

a first circuit which is utilized to obtain at the output of oscillator 6 an alternating current having a variable frequency as a function of the deviation signal, and a second circuit which is utilized to obtain, at the output of the oscillator a current in which the half waves are of variable amplitude as a function of the deviation signal.

The first circuit comprises a flip-flop bistable device 16, the input of which is connected in the one case, to timing device 17, and in the other case, to one of the terminals (terminal 18) of switch 15. Terminal 18 is also connected to a control device integrated with timing device 17 interrupting the latter during the generation of a deviation signal by comparator 14.

Terminal Q of flip-flop bistable device 16 controls the beginning of thyristors $Th_1$ and $Th_2$ through the intermediary of an appropriate control circuit 20.

In addition, terminal Q effects the control of thyristors $Th_3$ and $Th_4$, through the intermediary of control circuit 21, similar to circuit 20 and switching device 22 disconnects output Q during operation of the second circuit (switch 23).

The second circuit comprises a variable amplitude pulse generator 24 the output of which is connected to control circuit 20 for thyristors $Th_1$ and $Th_2$ through the intermediary of a switch 25.

This generator 24 can be controlled (switch 24') by either a variable voltage optionally, for example, originating from an outside regulation apparatus 26, or by a voltage resulting from the integration of the deviation signal which is furnished by integrator 27 effecting the connection between terminals 28 and 29 of switches 15 and 24'.

The operation of the previously described circuit is as follows:

I. —In the event the circuit is switched for operation of variable frequency oscillator 6 and in the case where the deviation signal emitted by comparator 14 is zero, which corresponds to a normal operation of the furnace in the absence of arc formation, timing device 17 regulates bistable flip-flop device 16 which passes alternately from state Q to Q and inversely. Consequently, switching devices 20 and 21 successively control the beginning and the end of conduction of the two groups of thyristors $Th_1$, $Th_2$ and $Th_3$, $Th_4$ at a frequency set by timing device 17.

In the case where the voltage delivered by detector 10 becomes greater than the reference voltage $V_{ref}$, which is produced at the time of arc formation, comparator 14 furnishes a voltage pulse which, at the first pulse deactivates timing device 17 and activates the flip-flop bistable device 16. There is thus provided a counter-reaction circuit which is substituted for timing device 17 for regulation of oscillator 6 as long as the voltage delivered by detector 10 is above the reference voltage.

Figure 2:
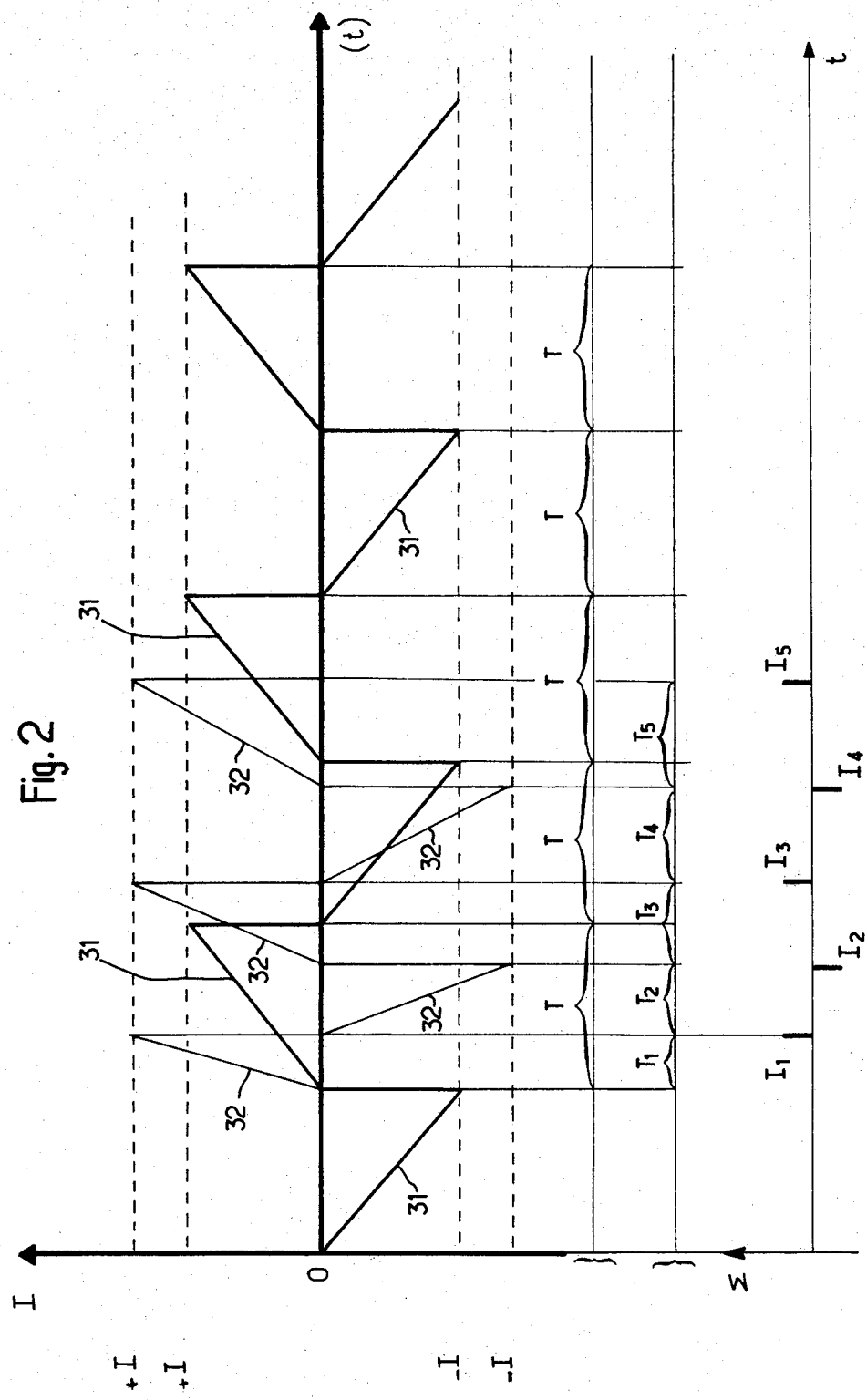
FIG. 2 is a diagram showing the intensity curve crossing the induction coil used in the generator of FIG. 1 represented as a function of time.

This operation is illustrated in the diagram shown in FIG. 2 in which:

Curve 31 represents the intensity as a function of the time of the current crossing induction coil 9 during normal operation without any arc formation. The positive half wave portions correspond to conduction periods T of thyristors $Th_1$ and $Th_2$ while the negative portions of the wave T' correspond to the conduction periods of thyristors $Th_3$ and $Th_4$—(T=T').

Curve 32 represents the intensity as a function of the time of the current crossing the induction coil at the time of arc formation. It is observed that at the time of arc formation, during the first half wave, the current increases (linearly) more rapidly than in normal operation and reaches, after having passed the value $I_{nom}$, the value $I_{ref}$ (corresponding to $V_{ref}$), after a time less than period T. When it reaches $V_{ref}$, comparator 14 emits pulse $I_1$, disconnecting the timing device 16, which reverses the conducting state of thyristors $Th_1$, $Th_2$, $Th_3$ and $Th_4$ of the oscillator. Positive half waves will therefore be maintained during period $T_1$ less than T. If the arc formation continues, during the negative half wave which follows, the current increases rapidly again in induction coil 9 and a new switching is produced after a period $T_2$ when comparator 14 produces a pulse $I_2$. This process is therefore continued (periods $T_3$, $T_4$, $T_5$, pulses $I_3$, $I_4$, $I_5$) as long as the current crossing induction coil 9 is greater than current $I_{ref}$.

Consequently, during arc formation, the frequency of the signal generated by oscillator 6 increases, which results in a corresponding increase in the impedance of induction coil 9. This impedance increase opposes the increase in voltage passing through induction coil 9, and diminishes in proportion to the available power transmitted by rectifier 12.

II. —In the event the circuit is switched so that oscillator 6 furnishes a current in which the half waves have a variable amplitude, a pair of thyristors of the oscillator are used, for example, thyristors $Th_1$ and $Th_2$ in forced switching, with thyristors $Th_3$ and $Th_4$ being regulated by natural switching.

In this case, switch circuit 20 associated with thyristors $Th_1$ and $Th_2$ is regulated by a variable duration signal generator 24, controlled either by outside regulator 26 associated with thermal treatment furnace 13 and able to account for the nature and form of the pieces being treated or else by a signal resulting from the integration of the deviation signal furnished by comparator 14.

In the latter case, the emission of a deviation signal causes a corresponding decrease in the half waves emitted by oscillator 6.

The previously described circuits can in addition be advantageously provided with a device for reducing the power of the generator at the time of an arc formation.

This device uses detector 33 to measure the power current intensity of rectifier thyristors 3.

This detector 33 furnishes a voltage to comparator 34 which receives, at its second input, the reference voltage $V_{ref}$, and which transmits the result of this comparison to switching device 35 regulating thyristors 3 of the rectifier.

This switching device 35 also receives a deviation signal furnished by comparator 36, similar to comparator 14, but with a longer response time, which receives respectively at its two inputs the voltage supplied by detector 10 and the reference voltage $V_{ref}$.

Moreover, comparator 36 can also receive information regarding the frequency of the oscillator, this information capable of substituting for the voltage deviations furnished by comparators 36 and 14 to control the power delivered by rectifiers 3.

As a function of these parameters, the switching device can therefore modify the conduction phase or angle of thyristors 3 in order to reduce the rectified power current when arcing is initially produced.

What is claimed is:

1. Auto-stabilized high power electric generator, especially adapted for powering a process involving a discharge into a rarified gaseous atmosphere, which comprises a controllable frequency oscillator connected to a rectifier circuit by a connection comprising, in series, an induction coil, a measuring device which furnishes a detected signal representing the current flowing between said oscillator and said rectifier, and a comparator comparing said signal with a reference signal, and which controls the frequency of said oscillator so as to cause an increase in frequency when said detected signal becomes greater than the reference signal, said oscillator being regulated by a switching device controlled, in the event the detected signal is less than the reference signal, by a timing device, and in the event the detected signal is higher than the reference signal, by the pulses delivered by said comparator.

2. Generator according to claim 1, wherein the signals furnished by said oscillator are controllable as to amplitude, and wherein the regulation of said oscillator is effected by a constant frequency pulse generator, the amplitude of which varies as a function of the deviation signal furnished by said comparator.

3. Generator according to claim 1, wherein the power of said current source is regulated as a function of the difference between said detected signal and reference signal and/or as a function of the difference between a signal representing the intensity of the current flowing from said source and said reference signal.

4. Generator according to claim 3, wherein said current source operates from the alternating current of the network, and comprises a rectifier thyristors mounted in a bridge, optionally followed by a standard filter, with the power variation of the source then being obtained by varying the conduction angle or phase of the thyristors.

5. Generator according to claim 1, wherein said oscillator comprises an assembly of four thyristors mounted in a bridge.

6. Generator according to claim 1, wherein said comparator is connected to a circuit comprising a bistable flip-flop device the input of which is connected either to a timing device or to one of the terminals of a switch connected to a comparator, said terminal being connected to a control device integrated with said timing device and interrupting the latter when a deviation signal from the comparator in which signal Q of said bistable flip-flop controls thyristors $Th_1$ and $Th_2$ by said control circuit and in that signal Q of said bistable flip-flop device controls thyristors $Th_3$, $Th_4$, through the intermediary of said control circuit.

7. Generator according to claim 1, wherein said generator further comprises a circuit having a variable amplitude pulse generator, the output of which is connected to the control circuit of thyristors $Th_1$ and $Th_2$, this circuit being controlled either by a variable voltage originating either externally to the regulation device or by a voltage resulting from the integration of the deviation signal delivered by the comparator.

* * * * *